(12) United States Patent
Arai

(10) Patent No.: US 6,415,896 B1
(45) Date of Patent: Jul. 9, 2002

(54) TORQUE-RECEIVING MEMBER AND BRAKE CYLINDER ARRANGEMENT FOR DRUM BRAKE

(75) Inventor: Nobuhisa Arai, Toyoake (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/684,896

(22) Filed: Oct. 10, 2000

(30) Foreign Application Priority Data

Oct. 7, 1999 (JP) .......................................... 11-287386

(51) Int. Cl.[7] .............................................. F16D 51/00
(52) U.S. Cl. .................................... 188/343; 188/106 F
(58) Field of Search ................. 188/74, 343, 106 A, 188/106 F

(56) References Cited

U.S. PATENT DOCUMENTS

| 2,140,750 A | * | 1/1938 | Kliesrath | 188/343 |
| 3,599,763 A | * | 8/1971 | Bailey | 188/343 |
| 4,013,150 A | * | 3/1977 | Crabtree | 188/343 |
| 4,519,482 A | * | 5/1985 | Ott et al. | 188/343 |
| 4,666,022 A | * | 5/1987 | Layton | 188/343 |

* cited by examiner

Primary Examiner—Paul N. Dickson
Assistant Examiner—Robert A. Siconolfi
(74) Attorney, Agent, or Firm—Liniak, Berenato, Longacre & White

(57) ABSTRACT

The cylinder body 11 has the first boss 11d through which the wedge-actuating mechanism is inserted and the second boss 11e having an inlet port and outlet port of the fluid away from the first boss 11d, where the first boss 11d is fit in the boss fitting hole 33 of the torque-receiving member 30 while the second boss 11e is positioned adjacent to the outside of surrounding edge of the torque-receiving member 30.

5 Claims, 9 Drawing Sheets

TORQUE-RECEIVING MEMBER AND BRAKE CYLINDER ARRANGEMENT FOR DRUM BRAKE

BACKGROUND OF THE INVENTION

1. Field of the Invention

This invention relates to a drum brake device suitable for a heavy-duty commercial vehicle.

2. Description of Related Art

A cylinder device in combination of a hydraulic operated type service brake and a mechanical wedge operated type parking brake is disclosed in the Published Unexamined Japanese Utility Model Application Number 57-141241.

A conventional cylinder device a is explained with reference to FIGS. 8 and 9, where a cylinder body b is configured with three pistons $c_1$-$c_3$ slidably fitting therein in series.

The cylinder body b is comprised of a first boss $b_1$ through which a rod d of a wedge-actuating mechanism is penetrated and a second boss $b_2$ having inlet and outlet ports for a brake fluid. A fitting portion, which includes both boss $b_1$ and boss $b_2$, is fitted into a fitting hole g opened in a back plate e and a reinforcing plate f superposed thereon to be fixed by bolts n.

When in service-brake operation, the brake fluid is supplied to a hydraulic chamber i formed between the piston $c_2$ and the piston $c_3$ via a brake pipe j in order to separate a pair of brake shoes k, k. While in parking brake operation, the pair of brake shoes k, k separate by pulling a wedge inserted between the intermediate piston $c_2$ and a piston $c_1$ via rollers.

In the above-conventional structure, the pair of brake shoes k, k tend to accidentally tilt because an opening side of the brake drum (not shown in the figures) deforms outward and a bending force is exerted on the back plate e and the reinforcing plate f via an anchor which is supporting the brake shoes k, k. A biasing force affecting the cylinder body b during this condition is supported by the back plate e and the reinforcing plate f.

The above-described conventional drum brake device suffers from the following drawbacks that need improvement.

The fitting portion including the first boss $b_1$ and the second boss $b_2$ of the cylinder device a is fit in the fitting hole g provided in the back plate e and the reinforcing plate f. For the purpose of reducing the total weight of the drum brake device, in order to avoid enlarging the thick reinforcing plate f, the distance between the first boss $b_1$ and the second boss $b_2$ is designed to be shorter. Therefore, the conventional device has disadvantage in connecting the brake pipe j on the second boss $b_2$ and in air bleeding work by loosening a bleeder (not shown in figure) mounted on the member m of the second boss $b_2$. Further, the conventional device leaves a possibility of damaging a dust boot h during the above-described operation.

In order to resolve the above-described problem, if the fitting hole g is enlarged to lengthen the distance between the first boss $b_1$ and the second boss $b_2$, the thickness of the reinforcing plate f and back plate e must be increased or an outside form of the reinforcing plate f must be enlarged to provide reinforcement; thereby, causing another problem of the weight increase and the difficulty in the design layout.

SUMMARY OF THE INVENTION

It is an object of this invention to provide a cylinder device for a drum brake device which improves workability in connecting the brake pipe and in bleeding the air as well as enables to lightening the drum brake device.

This invention is a torque-receiving member and a brake cylinder arrangement for a drum brake device. The brake cylinder has a plurality of pistons slidably housed in series within a cylinder body. A wedge-actuating mechanism comprises a wedge and rollers positioned between one pair of two facing pistons among said plurality of pistons. A hydraulic chamber is formed between the other pair of two facing pistons among said plurality of pistons, and cylinder body is fixed on said torque-receiving member. A first boss is formed in the cylinder body through which a rod of the wedge-actuating mechanism is penetrated. A second boss positioned away from the first boss of the cylinder body has an inlet port and an outlet port for a fluid channel leading to the hydraulic chamber. The first boss is fit into a boss-fitting hole of the torque-receiving member, and the second boss is positioned adjacent to the outside of the outermost end of the torque-receiving member.

This invention further is a torque receiving member and a brake cylinder arrangement for a drum brake device, wherein fluid channels, leading from the inlet port and outlet port to the hydraulic chamber, consist of a slope channel running from the inclined end surface of said second boss toward hydraulic chamber and a straight channel running from the flat surface of second boss to an intermediate portion of slope channel. The fluid channel is a combination of the slope channel and the straight channel is a "<" shape, and an opening of the slope channel is closed airtight.

This invention still further is a torque-receiving member and a brake cylinder arrangement for a drum brake device, wherein the opening of the slope channel is closed airtight by a plug. A top of said plug is positioned adjacent to a cross-point portion between slope channel and the straight channel so as to minimize the residual space of slope channel.

This invention still further is a torque-receiving member and a brake cylinder arrangement for a drum brake device, wherein the wedge-actuating mechanism is configured to push a rod to apply the brake.

This invention yet is a torque-receiving member and a brake cylinder arrangement for a drum brake device, wherein the wedge-actuating mechanism is configured to pull said rod to apply the brake.

BRIEF DESCRIPTION OF THE DRAWINGS

The above and other objects and the attendant advantages of the present invention will become readily apparent by reference to the following detailed description when considered in conjunction with the accompanying drawings.

DETAILED DESCRIPTION OF PREFERRED EMBODIMENTS

Figure 1:
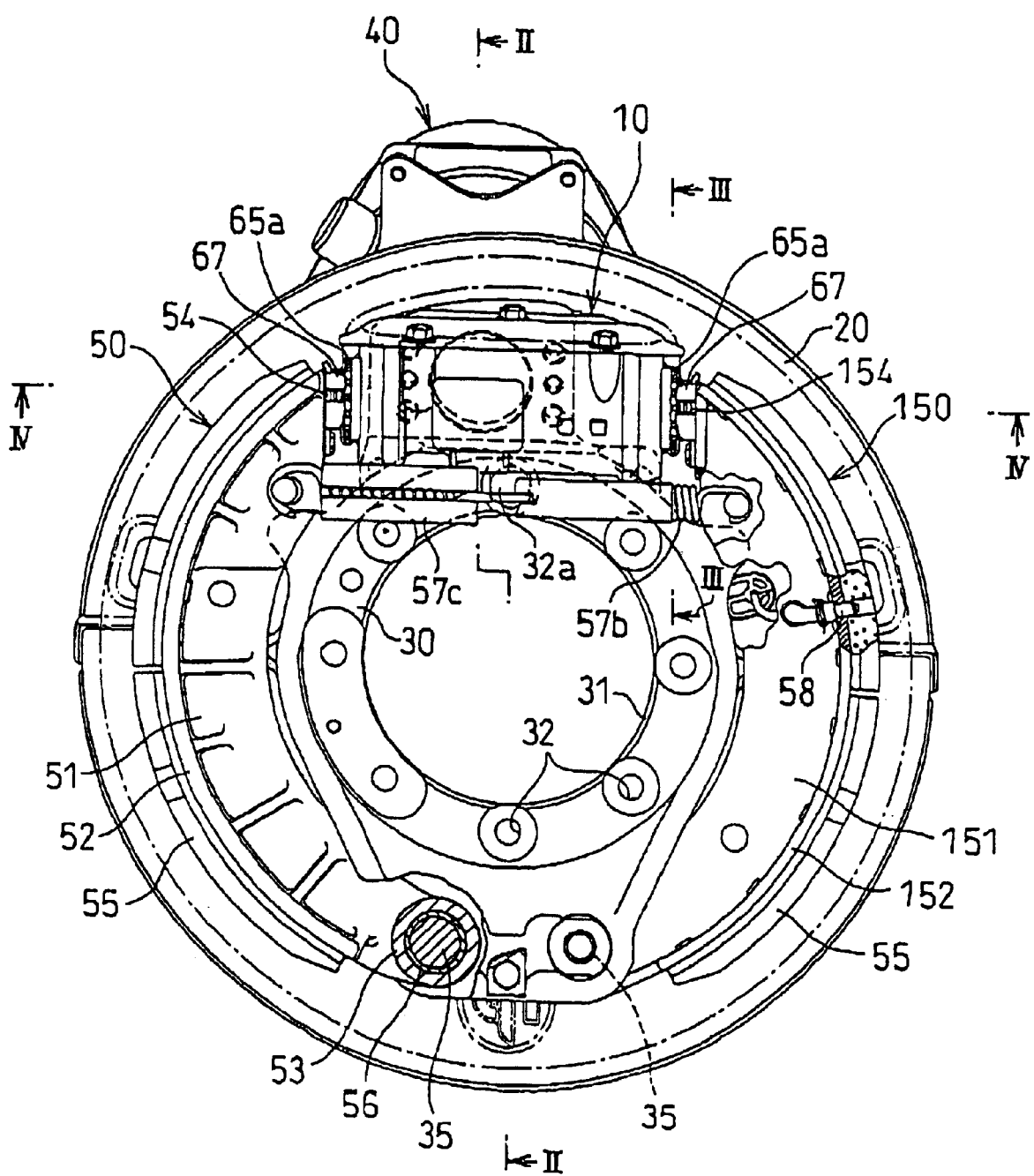
FIG. 1 is a plan view of the drum brake device of this invention.
Figure 2:
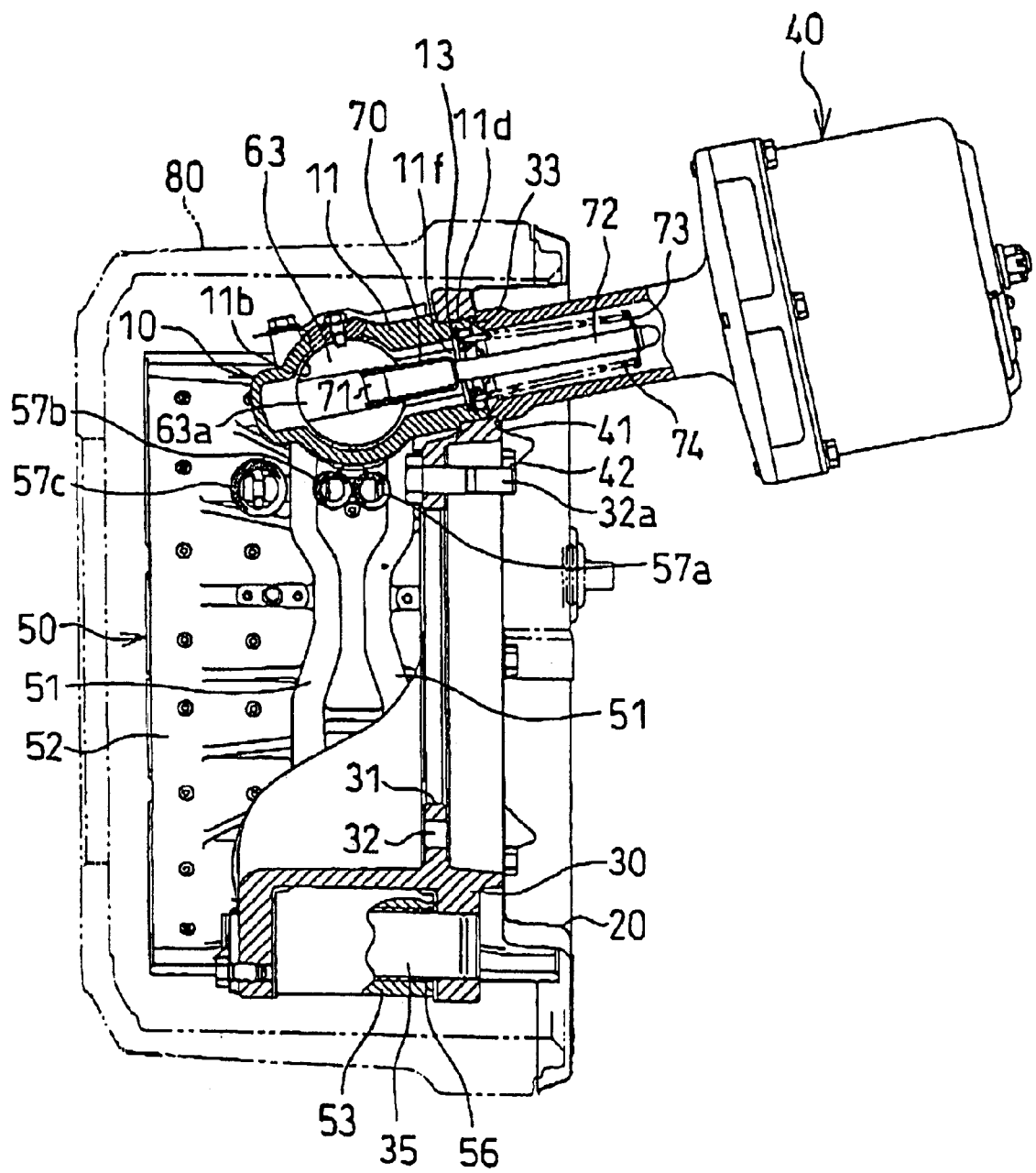
FIG. 2 is a vertical cross section view of the center in FIG. 1 taken along the line II—II.
Figure 3:
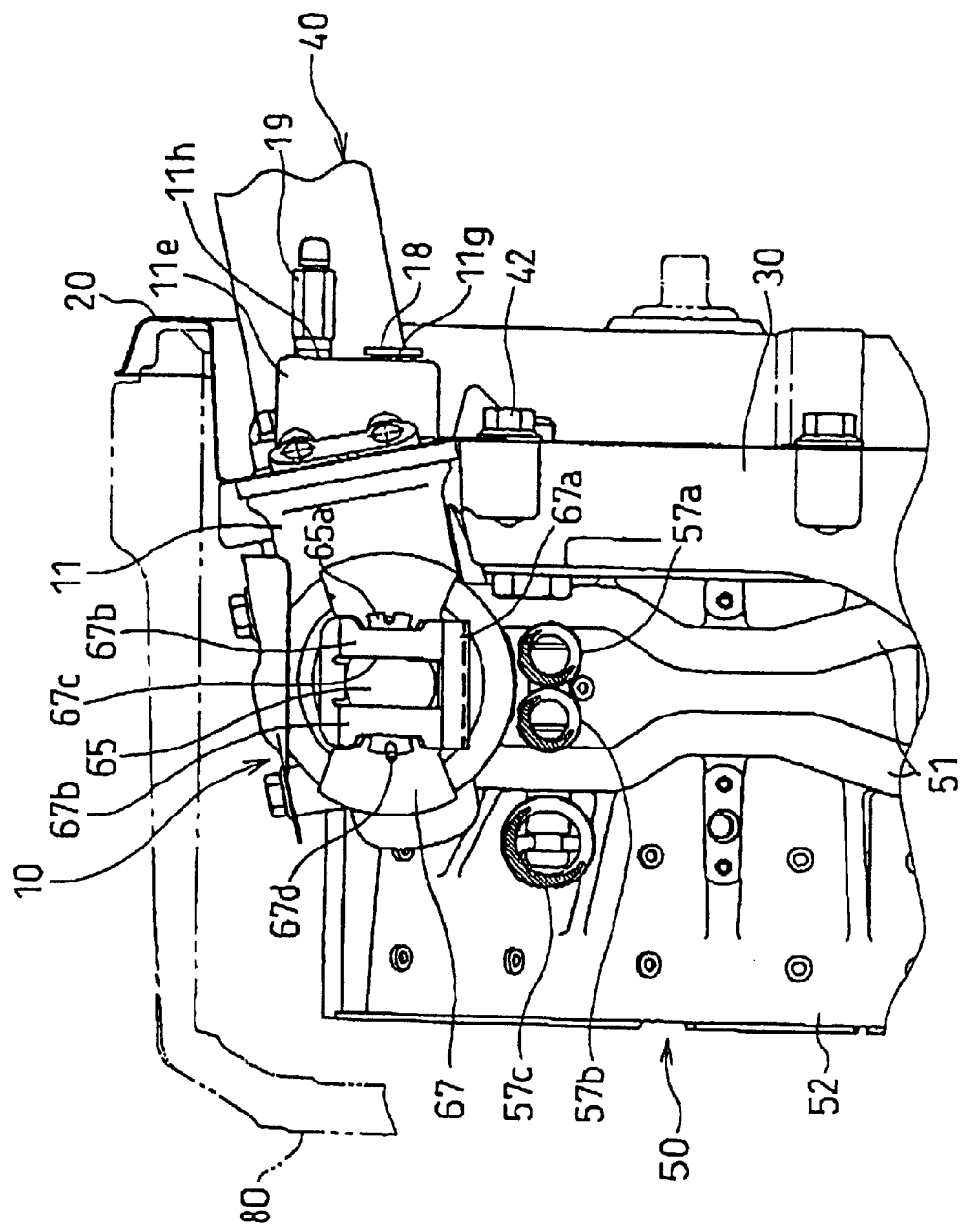
FIG. 3 is a cross section view of FIG. 1 taken along the line III—III.

Embodiment 1 of the invention is explained with reference to FIGS. 1–7. FIG. 1 is a plan view of a drum brake device with a cylinder device 10. FIG. 2 is a vertical cross-section view of the center of the drum brake device taken along the line II—II in the FIG. 1.

A cylinder device 10 is mounted on a cast-iron torque-receiving member 30 (corresponding to a combination of the conventional back plate e and the reinforcing plate f), and a pair of anchor pins 35 mounted at the lower portion of the member 30. A pair of brake shoes 50, 150 is pivotally rotatably supported with the anchor pins 35 in the operation of the cylinder device 10.

A conventional air chamber 40 is a power source for the later explained operation of the wedge-actuating mechanism and is positioned at the external side of the drum brake with respect to the view of FIG. 1.

A dust cover plate 20 is positioned to face an opening portion of a brake drum 80 (shown in two-dot chain line in FIG. 2) and is to have a waterproof and dustproof function for inside of the brake. The dust cover plate 20 shown in this embodiment is a combination of thin semi-circular plates. However, the configuration of the dust cover plate 20 is not limited to what is shown in this embodiment, and the dust cover plate 20 may be an integrally-formed member. In the design of the prior-art, the back plate e has waterproof and dustproof functions.

The torque-receiving member 30 has a center spigot 31 through which an axle shaft, on which the brake drum 80 and a wheel are installed, penetrates and around which plural bolt installation holes 32 are formed.

The torque-receiving member 30 is fixed on the stationary portion of the vehicle integrally with the dust cover plate 20 using the bolt installation holes 32. As a result of a limitation of a space layout, a fixing bolt 32a is pre-fixed in FIG. 1.

Figure 6:
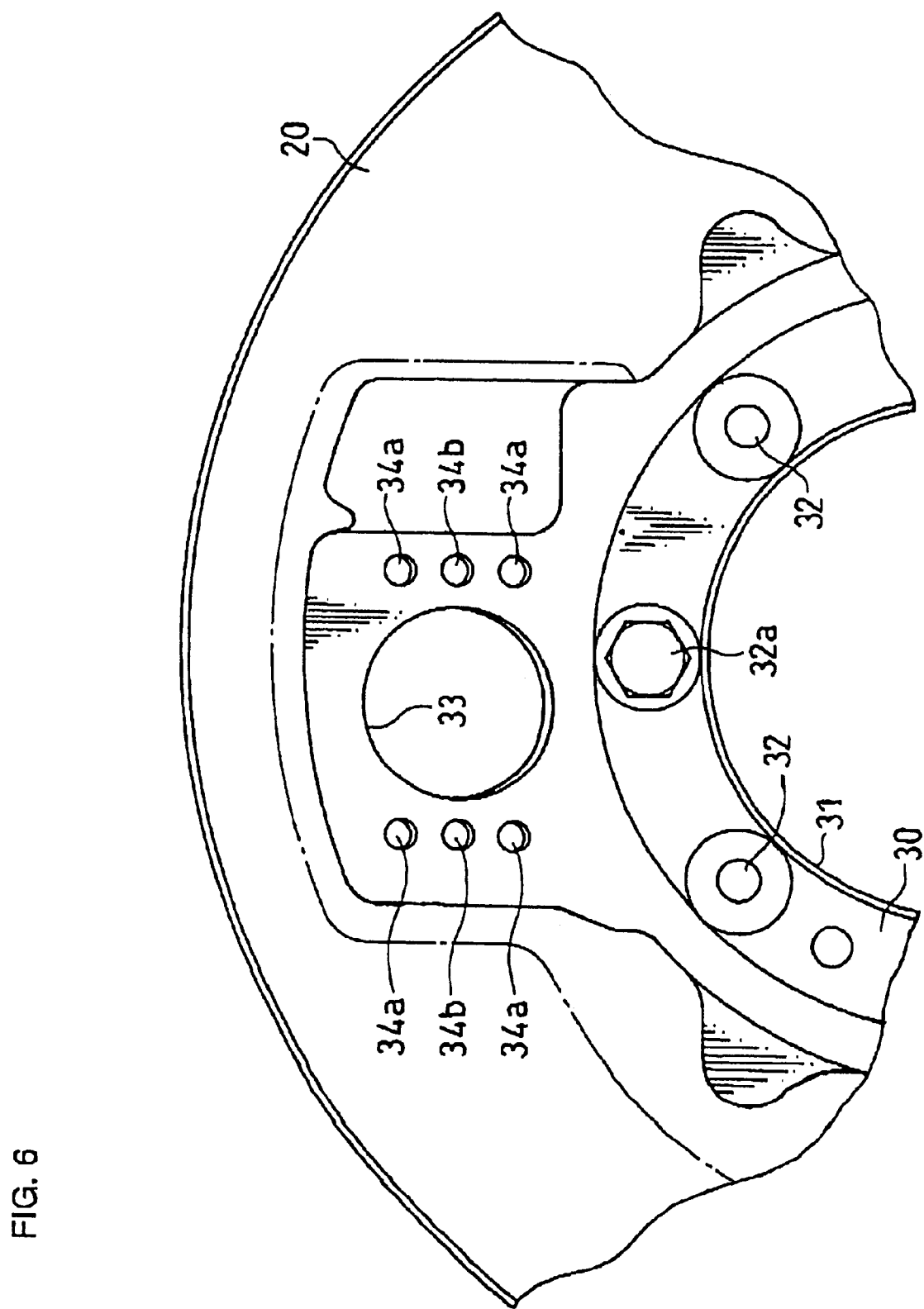
FIG. 6 is a partial plan view of the torque-receiving member and the dust cover plate prior to assemble the cylinder device viewing from the inside of the brake.
Figure 7:
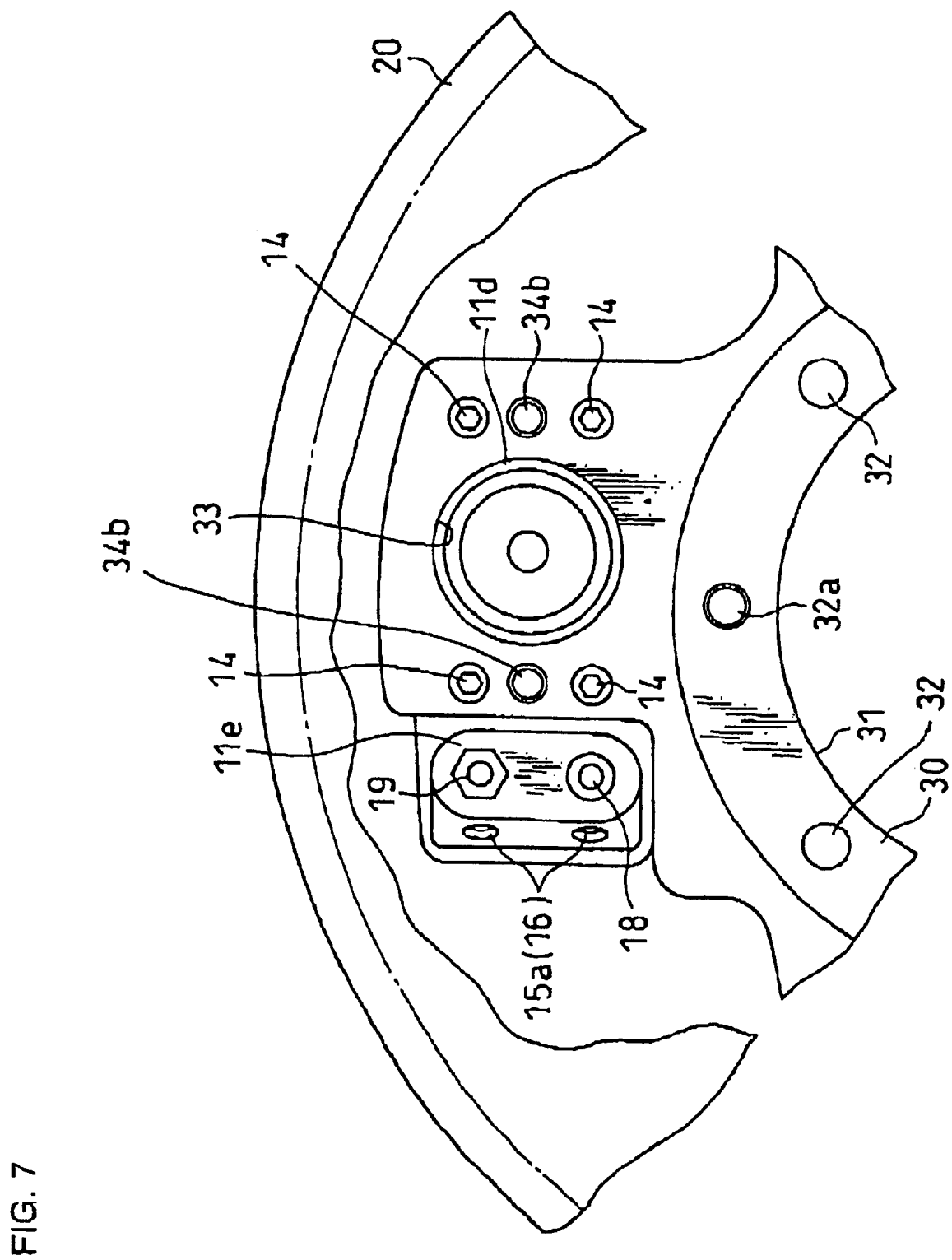
FIG. 7 is a partial rear view of the torque-receiving member and the dust cover plate after assembling the cylinder device viewing from the outside of the brake.

The upper part of the torque-receiving member 30 in FIGS. 1, 6 and 7 is rectangular-like in shape and has a circular boss fitting hole 33, a plurality of bolt installation holes 34a, and screw holes 34b.

The lower part of the torque-receiving member 30 in the FIGS. 1 and 2 has holes in which both ends of each anchor pins 35, 35 are fitted, and each lower end of the brake shoes 50, 150 is supported with the anchor pins 35 with shoes being rotatably mounted.

The brake shoe 50 in FIG. 1 has a shoe body made of cast-iron, and a shoe body of the brake shoe 150 is made of steel plates.

The shoe body of the brake shoe 50 comprises two shoe webs 51, 51, which are almost crescent-shape and are positioned with a gap in their cross-direction inbetween, a shoe rim 52 curved and formed along the periphery of the shoe webs 51, 51, a boss 53 formed on the lower end of the shoe webs 51, 51, and a member activated 54 at the upper end of the brake shoe 50 engaging with a piston 61. The shoe body is integral formed by casting and a lining 55 fixed on the peripheral surface of the shoe rim 52 by conventional means such as by rivet.

The shoe body of the brake shoe 150 is assembled permanent securely by welding in combination of individually made two, shoe webs 151, 151, the hollow boss and a member to be activated 154. The member to be activated 154 of the brake shoe 150 is engaged with actuating member including the piston 61 of the cylinder device 10, and a shaft bearing 56 pressed in the hollow boss at the lower end of the brake shoe 150 is relatively pivotally supported by the anchor pin 35 as described above.

The adjacent brake shoes 50, 150 are retracted by three shoe return springs 57a, 57b, 57c extended therebetween at the upper side of the brake shoes 50, 150. The shoe return spring 57c among the three applies a biasing force on the brake shoes 50, 150 facilitating the installation of the brake drum 80.

The brake shoe 150 has a publicly known sensor 58 penetrating through the shoe rim 152 and designed to electrically sense the limit of lining wear.

The cylinder device 10 is explained with reference to FIGS. 4 and 5.

A cylinder body 11 fixed on the torque-receiving member 30 with four installation bolts 14 is integrally formed of a cylindrical portion having bores 11a, 11b. A first boss 11d through which the later described wedge-actuating mechanism crosses the cylindrical portion, and a second boss 11e functioning as a fluid channel away from the first boss 11d.

The three pistons 61, 62, 63 are slidably fit in the hetero-diameter bores 11a, 11b of the cylinder body 11 in series. There is a hydraulic chamber 12 formed between the piston 61 with a piston seal 61a and the intermediate piston 62 with a piston seal 62a.

The larger diameter bore 11a and the smaller diameter bore 11b may be designed to be the same diameter.

When in service brake operation, by pressurizing the hydraulic chamber 12, the piston 61 is pushed outwardly while the piston 63 is also pushed outwardly in the opposite direction via the piston 62, rollers 71, and a wedge 70, thereby separating the pair of brake shoes 50, 150 ultimately braking the brake drum 80.

The cylinder device 10 has the following automatic shoe clearance adjustment device.

A coaxial blind hole 61b is formed at the half of the piston 61, and a nut 64 is relatively rotatably fit into the blind hole 61b.

An adjusting bolt 65, which is screwed into the nut 64, has plurality of adjustment teeth 65a formed on the circumferential flange surface at the end thereof. By rotating the adjusting bolt 65 via the adjustment teeth 65a from the outside of the brake using an appropriate tool, the adjusting bolt 65 is screwed out from or screwed into the nut 64 for a manual adjustment of the shoe clearance.

A screw thread engagement of the nut 64 and the adjusting bolt 65 is designed to be "non-reversible screw-thread engagement". The term "non-reversible screw-thread engagement" means the screw thread engagement which does not allow relative rotation between the nut 64 and the adjusting bolt 65 even if a thrust force in the axial direction is acted either on the nut 64 or the adjusting bolt 65.

A receiving plate 67 is attached with the stepped flange surface at the screw side of the adjusting bolt 65 and is clamped on the screw shaft of the adjusting bolt 65. A rectangular portion 67a (see FIG. 5) extending from one end of the receiving plate 67 is folded so as to stride over the adjustment teeth 65a between the body of the receiving plate 67 and a folded portion 67b. A groove 67c is formed on the folded portion 67b in order to retain the member to be activated 54, 154 on the shoe webs 51, 151. In addition, a projection 67d protruding from the body of the receiving plate 67 is disposed between the pitch of the adjustment teeth 65a to avoid a self-rotation of the adjusting bolt 65 and to give a clicking feel to operators when in manually adjusting the shoe clearance.

A ring-shaped clutching plate 69 engages with threads 64a formed on the peripheral surface of the nut 64 with a conical surface 69a at the outer peripheral surface thereof being into clutch-engagement with a corresponding conical surface 11c at an open end of the bore 11a.

The nut 64 and the clutching plate 69 are designed to be a "reversible screw-thread engagement", and the term, "reversible screw-thread engagement" means the screw-thread engagement which does allow relative rotation between the nut 64 and the clutching plate 69 if a thrust force is acted on either one of the nut 64 or the clutching plate 69.

A spring 68 sets between an abutting plate 66 fixed on the nut 64 and the clutching plate 69 urges the clutching plate 69 into clutch engagement with the conical surface 11c of the bore 11a.

The automatic shoe-clearance adjustment operation will now be described. If the hydraulic chamber 12 is pressurized while the lining is worn out, the piston 61 advances together with the nut 64 and the adjusting bolt 65. At that time, the movement of the nut 64 exceeds a gap (backlash) of the reversible screw-thread engagement with the clutching plate 69, thereby urging the clutching plate 69 out of clutch engagement and into rotation.

Upon releasing the pressure in the hydraulic chamber 12, the piston 61 is retracted to the initial position by the force of the shoe return springs 57a–57c. During this process, if the nut 64 moves backward to the extent of the gap (backlash) of the screw-thread engagement with the clutching plate 69, the rotational resistance of the clutching plate 69 rapidly increases, and after that, the nut 64 rotates until a large diameter portion 61c of the piston 61 abuts against the stepped surface of the bore 11a, thereby maintaining the constant shoe clearance by screwing the adjusting bolt 65 out from the nut 64.

The piston 63 also incorporates the automatic shoe clearance adjustment device, where the structure and operation of the automatic shoe clearance adjustment device is same as the one explained for the piston 61, and the explanation of which is omitted here.

The automatic shoe clearance adjustment device may be other known devices or the present invention may be established without any automatic shoe clearance adjustment device. The manual shoe clearance adjustment device may be installed at the lower end side of the brake shoes, i.e., at the anchor pins 35 in FIG. 1.

Figure 4:
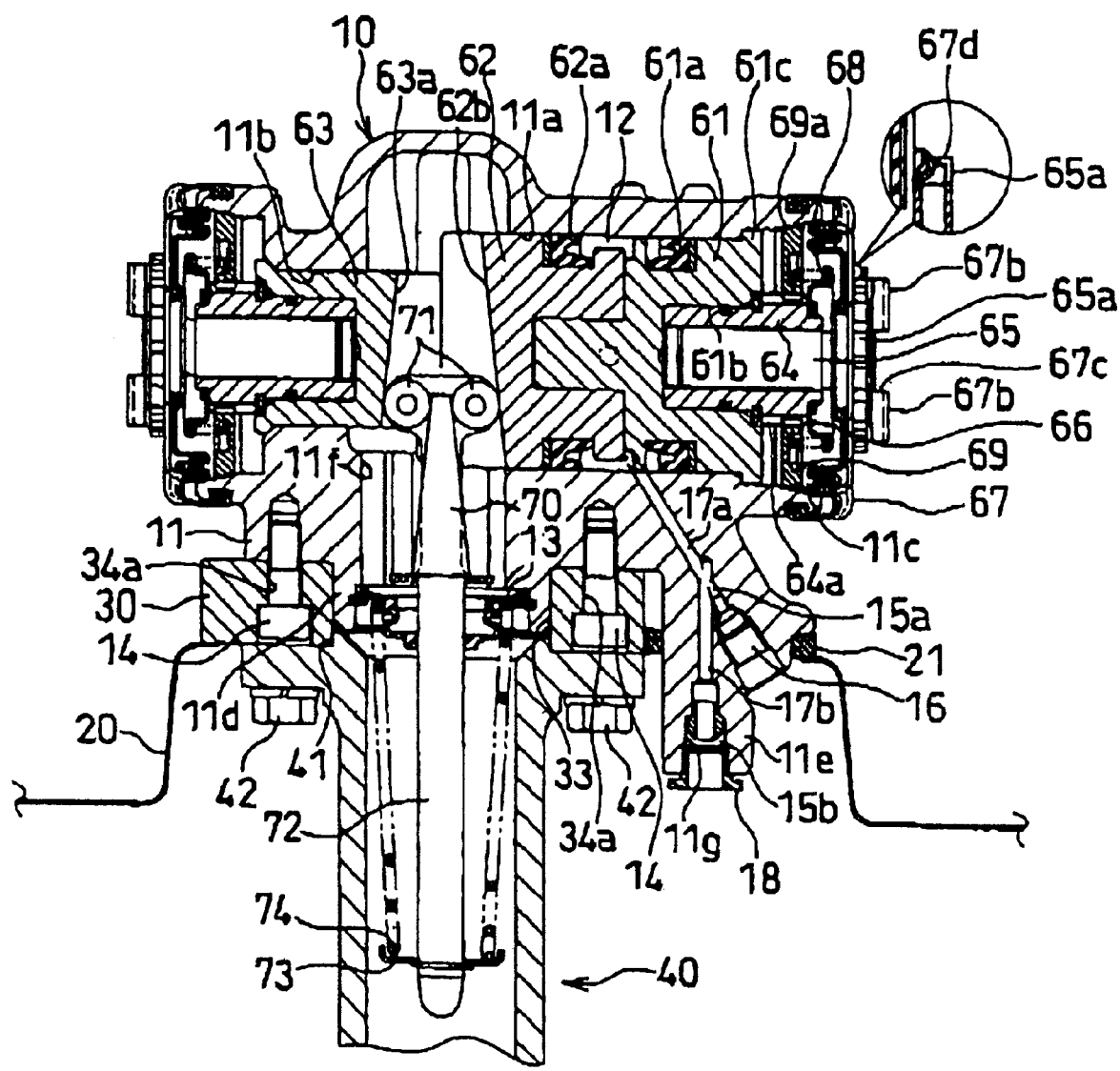
FIG. 4 is a cross section view of FIG. 1 taken along the line IV—IV.

As shown in FIG. 4, inclined grooves 62b, 63a are provided on the facing surfaces of the piston 62 and 63 respectively, and the space defined by the inclined grooves 62b and 63a becomes wider as it goes lower in figure.

The conventional wedge 70 with rollers 71, 71 is inserted between the inclined grooves 62b, 63a.

A rod 72 integrally formed with or connected to the wedge 70 is projected out through an opening 11f formed in the first boss 11d.

A return spring 74 is set between a retaining ring 13 mounted on the opening 11f and a retaining ring 73 mounted on the rod 72 in order to maintain the initial position of the wedge-actuating mechanism by the force of the return spring 74.

Upon switching the air chamber, the rod 72 is pressed, and the rollers 71, 71 role and climb along the inclined grooves 62b, 63a of pistons 62, 63, thereby directly pressing the piston 63 ultimately pressing the piston 61 via the piston 62. Accordingly, the pair of brake shoes 50, 150 is urged to separate each other into frictional engagement with the brake drum 80.

A boss portion 41 of the air chamber 40 faces the first boss 11d of the cylinder device 10 and fits in a boss fitting hole 33 of the torque-receiving member 30. Two installation bolts 42 are used to fix the air chamber 40 airtightly on the torque-receiving member 30.

The first boss 11d and the second boss 11e of the cylinder device 10 of this invention are explained with reference to FIGS. 4 and 5.

Only the first boss 11d through which the wedge mechanism is inserted may be fit in the boss fitting hole 33. The second boss 11e, such as for inlet and outlet ports and fluid channel, may be positioned away from the first boss 11d in the operational direction of the pistons and is positioned adjacent to the outer edge of the torque-receiving member 30.

Because of this structure, the second boss 11e penetrates only through the dust cover plate 20, not through the torque-receiving member 30.

Figure 8:
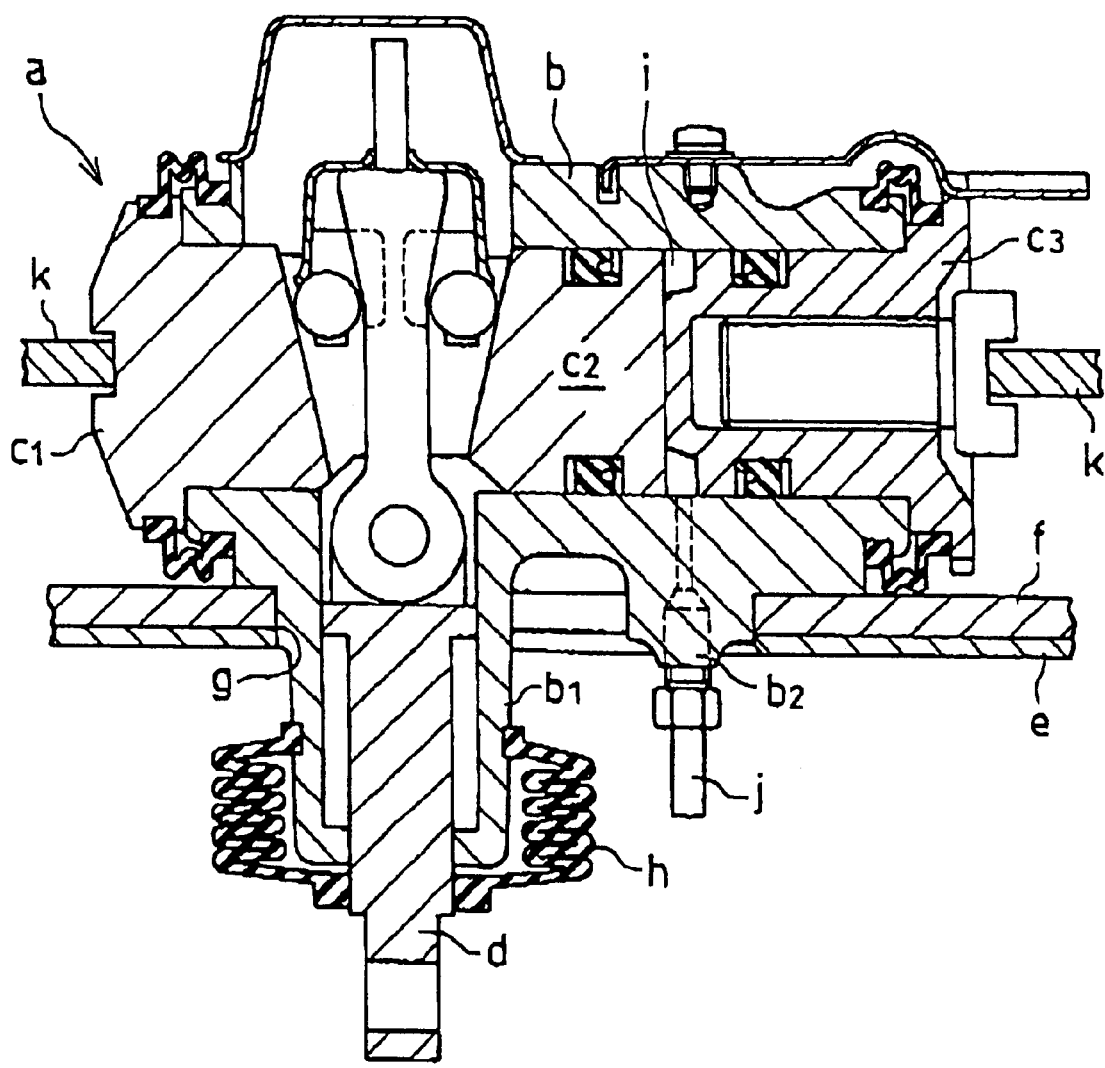
FIG. 8 is a cross section view of the conventional cylinder device installation portion.
Figure 9:
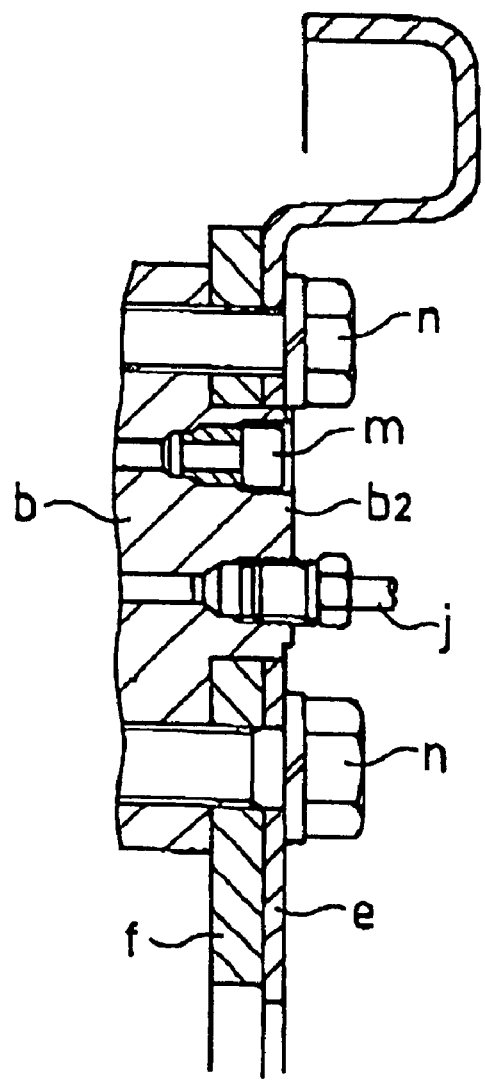
FIG. 9 is a cross section of the second boss of FIG. 8.

As shown in the conventional device of FIG. 8, in order to interfit the fitting portion including the first boss $b_1$ and the second boss $b_2$, both integrally formed with the cylinder body d, elongate fitting holes g are formed on the back plate e and the reinforcing plate f In this invention, the diameter of the boss fitting hole 33 may be limited just enough to fit the first boss 11d therein, and the outside form of the rectangle portion of the torque-receiving member 30 may be minimized. This structure of the boss fitting hole 33, the first boss 11d, and the torque-receiving member 30 is shown in FIGS. 6 and 7 for a better and easier understanding. FIG. 6 shows the torque-receiving member 30 and the dust cover plate 20 prior to assembly of the cylinder device 10 viewed from the inside of brake, and FIG. 7 illustrates the cylinder device 10 viewed from the outside of brake showing partially broken torque-receiving member 30 and dust cover plate 20 after assembling.

As in the above-described structure, if the entire length of the cylinder device 10 can be designed longer, a fluid channel may cross the bore 11a at right angle at the position of the second boss 11e away from the first boss 11d and may provide directly in-line to the hydraulic chamber 12. However, as the current trend to make the drum brake device smaller, there is a limit in extending the entire length of the cylinder device 10, and it becomes difficult to design both the entire length of the cylinder device 10 to be shorter and the formation of the fluid channel in the second boss 11e to cross the bore 11a at right angle and to be provided directly in-line to the hydraulic chamber 12.

Figure 5:
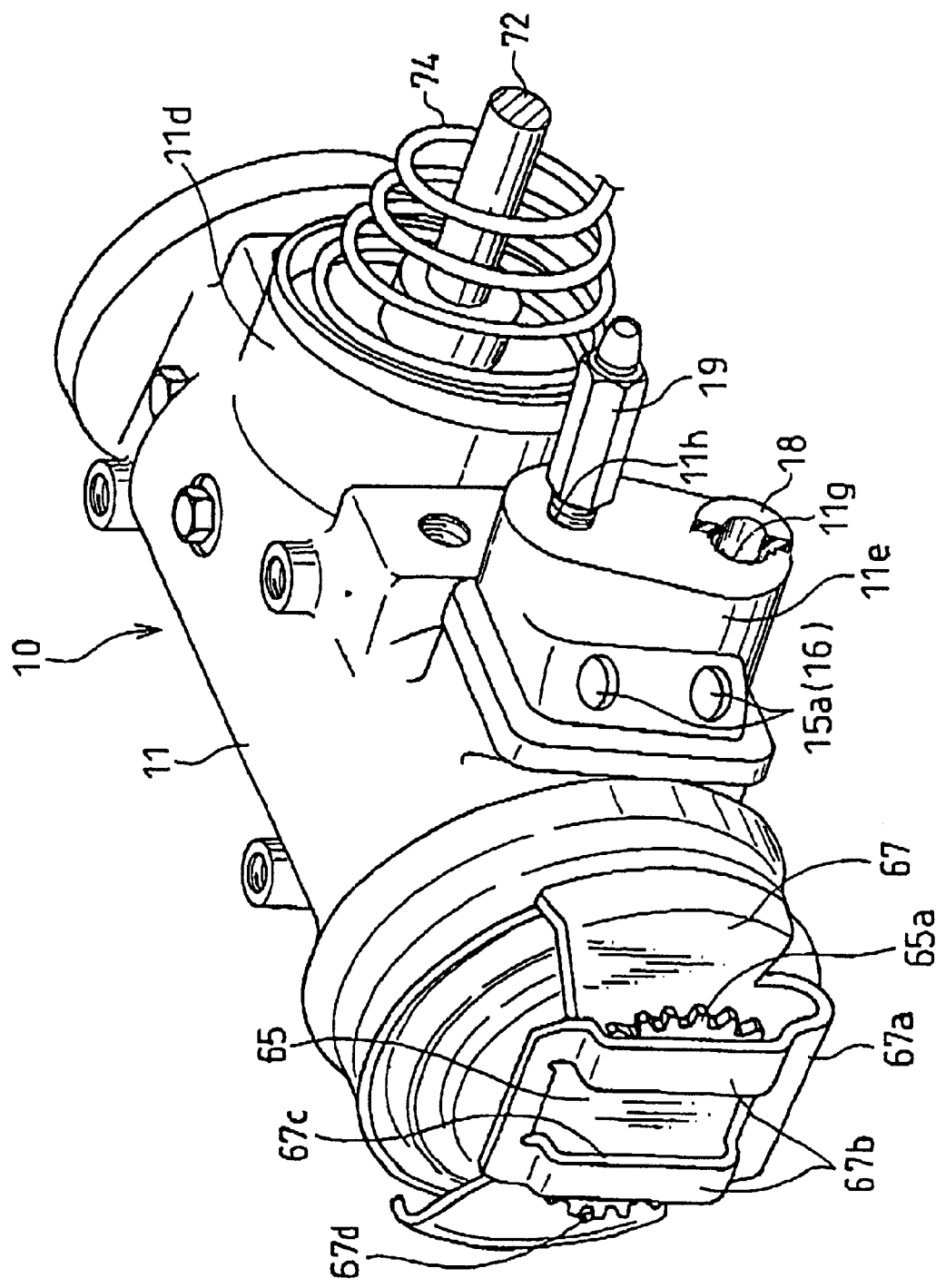
FIG. 5 is an isometric view of the cylinder device.

As shown in FIG. 5, this invention improves the following points for parallelly disposing an inlet port 11g and an outlet port 11h of the fluid in the second boss 11e side by side, and providing both outerwardly positioned away from the axis of the cylinder device 10 as much as possible.

Both inlet port 11g and outlet port 11h have almost same structure, and the explanation is made only as to the inlet port 11g with reference to FIG. 4, where the inclined fluid channel 15a is formed from the inclined end surface relative to the bore 11a at the right side of the second boss 11e toward the hydraulic chamber 12, and a straight fluid channel 15b is formed from the end surface parallel to the bore 11a toward the intermediate portion of the inclined fluid channel 15a in the direction of crossing the bore 11a at right angle.

The straight fluid channel 15b is designed to cross with the inclined fluid channel 15a within a predetermined length.

For example, using the blind plug 16 to close the opening portion of the inclined fluid channel 15a, the inlet port 11g is led to the hydraulic chamber 12 through channels 17a, 17b bent to form an elbow-shaped ("<" shaped) channel.

Since a hydraulic brake fluid is normally utilized as the working fluid, the top of the blind plug 16 may be positioned in the inclined channel 15a just before the crossing point with the straight channel 15b.

If there is a space at the opening side of the inclined channel 15a than the crossing point with the straight channel 15b, this residual space becomes an air pocket when bleeding air in the cylinder, and the complete air bleeding becomes very difficult.

By using the blind plug 16 to minimize the space, which may be a ground for creating the air pocket at the crossing point of the straight channel 15b, the air bleeding work may be facilitated.

The structure of the fluid channel leading from the outlet port 11h to the hydraulic chamber 12 is same as the above-described channel connecting from the inlet port 11g to the hydraulic chamber 12 (the channel connecting from the inlet port 11g to the hydraulic chamber 12 comprises the channels 17a, 17b forming an elbow-shape ("<" shaped) channel).

A protection cap 18 covers the inlet port 11g formed in the second boss 11e with a bleeder 19 being provided on the outlet port 11h. Instead of the bleeder 19, the fluid may be supplied to other cylinder device in the axial direction from the outlet port via a brake pipe.

For the use of the cylinder device, the protection cap 18 is removed, and the brake pipe is connected to the inlet port 11g.

A seal member 21 in FIG. 4 seals between surrounding of the second boss 11e and the dust cover plate 20.

In the above-described embodiment, the wedge-actuating mechanism is pushed to apply the parking brake. Instead of such mechanism in Embodiment 1, the wedge-actuating mechanism may be pulled to apply the parking brake.

The above embodiment explained a design where the hydraulic chamber 12 for service brake operation is provided only at one side of the wedge-actuating mechanism. However, the hydraulic chamber 12 may be also provided at the other side, thereby simplifying the joint structure between the wedge and the air chamber since the wedge-actuating mechanism may not be urged to incline when in service brake operation.

Because of the above-described structure, this invention has the following advantages.

The torque-receiving member has a hole sufficient to receive first boss but no additional hole is necessary for the second boss. Therefore, it is possible to design the drum brake device as well as the torque-receiving member smaller and lighter.

Especially for minimizing the drum brake device for a heavy-duty vehicle, this invention gives a large economic effect by providing better energy consumption and environmental advantages.

The second boss having the inlet and outlet ports can be positioned at the outside of the surrounding edge of the torque-receiving member away from the first boss. This facilitates the use of tool such as wrench or spanner for the brake pipe connecting work or the air bleeding work.

This invention eliminates the possibility of damaging the dust boot during the brake maintenance service.

Because the second boss is located outside of the torque-receiving member, there is no need to consider about the strength of the torque-receiving member when designing, which facilitate the brake layout.

The top of the plug closing the opening of the inclined fluid channel is positioned adjacent to the crossing point between the inclined fluid channel and the straight fluid channel to minimize the residual space of the inclined fluid channel, which removes the possibility of creating an air pocket and improves the air bleeding work.

It is readily apparent that the above-described invention has the advantages of wide commercial utility. It may be understood that the specific form of the invention hereinabove described is intended to be representative only, and certain modifications within the scope of these teachings will be apparent to those skilled in the art without departing from the spirit and scope of the invention.

Accordingly, reference should be made to the following claims in determining the full scope of the invention.

What is claimed is:

1. A torque-receiving member and a brake cylinder arrangement for a drum brake device, said brake cylinder comprising:

a plurality of pistons slidably housed in series within a cylinder body, a wedge-actuating mechanism comprising a wedge and rollers positioned between one pair of facing pistons among said plurality of pistons, a hydraulic chamber formed at another place between another pair of facing pistons among said plurality of pistons, a first boss, through which a rod of said wedge-actuating mechanism is passed, is formed in said cylinder body, a second boss, having an inlet port and outlet port for a fluid channel leading to said hydraulic chamber, is formed in said cylinder body physically separated from said first boss, and said cylinder body is fixed on said torque-receiving member with fixing members arranged around said first boss, wherein said first boss is fit into a boss-fitting hole of said torque-receiving member, and said second boss is positioned adjacent to the outside of the outermost end of said torque-receiving member and physically separated from said fixing member in an axial direction of the cylinder.

2. A torque receiving member and a brake cylinder arrangement for a drum brake device as claimed in claim 1, wherein at least one fluid channel, leading from said inlet port and outlet port to said hydraulic chamber, comprises a slope channel running from the inclined end surface of said second boss toward said hydraulic chamber and a straight channel running from the flat surface of said second boss to an intermediate portion of said slope channel, said fluid channel is defined by a combination of said slope channel and said straight channel to defined an angled shape, and an opening of said slope channel is closed airtight.

3. A torque-receiving member and a brake cylinder arrangement for a drum brake device as claimed in claim 2, wherein:

said opening of the slope channel is closed airtight by a plug, a top of said plug is positioned adjacent to a cross-point portion between said slope channel and said straight channel so as to minimize the residual space of said slope channel.

4. A torque-receiving member and a brake cylinder arrangement for a drum brake device as claimed in claim 1, wherein said wedge-actuating mechanism is configured to push said rod to apply the brake.

5. A torque-receiving member and a brake cylinder arrangement for a drum brake device as claimed in claim 1, wherein said wedge-actuating mechanism is configured to pull said rod to apply the brake.

* * * * *